United States Patent
Nowastowski-Stock

(10) Patent No.: US 10,957,470 B2
(45) Date of Patent: Mar. 23, 2021

(54) ASSEMBLY FOR A CABLE FEEDTHROUGH

(71) Applicant: CONTA-CLIP VERBINDUNGSTECHNIK GMBH, Hövelhof (DE)

(72) Inventor: Jörg Nowastowski-Stock, Detmold (DE)

(73) Assignee: CONTA-CLIP VERBINDUNGSTECHNIK GMBH, Hövelhof (DE)

( * ) Notice: Subject to any disclaimer, the term of this patent is extended or adjusted under 35 U.S.C. 154(b) by 0 days.

(21) Appl. No.: 16/184,439

(22) Filed: Nov. 8, 2018

(65) Prior Publication Data
US 2019/0139681 A1    May 9, 2019

(30) Foreign Application Priority Data
Nov. 9, 2017 (DE) .......................... 202017106818.8

(51) Int. Cl.
*H01B 17/30* (2006.01)
*H02G 3/22* (2006.01)
(Continued)

(52) U.S. Cl.
CPC .............. *H01B 17/30* (2013.01); *H01B 17/02* (2013.01); *H02G 3/0658* (2013.01); *H02G 3/22* (2013.01)

(58) Field of Classification Search
CPC .......... H01B 17/02; H01B 17/30; H02G 3/22; H02G 3/0658
See application file for complete search history.

(56) References Cited

U.S. PATENT DOCUMENTS 2,732,226 A * 1/1956 Brattberg ................ H02G 3/22
                                                              248/56
3,548,079 A * 12/1970 Wold .................. H02G 3/0675
                                                           174/153 G
(Continued)

FOREIGN PATENT DOCUMENTS

CN          203747330 U       7/2014
DE           20321038 U1       9/2005
(Continued)

OTHER PUBLICATIONS

Office action issued in counterpart application, Chinese App No. 201811330417.9. dated Feb. 3, 2020.

*Primary Examiner* — William H. Mayo, III
*Assistant Examiner* — Rhadames Alonzo Miller
(74) *Attorney, Agent, or Firm* — Harness, Dickey & Pierce, P.L.C.

(57) ABSTRACT

The invention relates to an assembly for a cable passthrough in a wall, with a cable feedthrough (1; 20) including: a sealing section (2) made from a soft plastic component, the sealing section (2) having an opening (4) extending in the lengthwise direction for sealing accommodation of a cable that is to be passed through a housing wall; a strain relief (3) made from a hard plastic component, which is formed integrally onto the sealing section (2) and has a passthrough (5) in the lengthwise direction for the cable that is to be passed through, which passthrough (5) is aligned with the opening (4); and a slotting arrangement (6) which extends over the sealing section (2) and the strain relief (3) in the lengthwise direction of the cable feedthrough (1; 20) and through which the cable to be passed through can be introduced into the opening (4) and the passthrough (5) from the outside from a direction transverse to the lengthwise direction.

14 Claims, 6 Drawing Sheets

(51) Int. Cl.
  *H02G 3/06* (2006.01)
  *H01B 17/02* (2006.01)

(56) References Cited

U.S. PATENT DOCUMENTS

| | | | | |
|---|---|---|---|---|
| 4,419,535 A * | 12/1983 | O'Hara | | H02G 3/22 |
| | | | | 169/48 |
| 5,116,413 A | 5/1992 | Nooren | | |
| 5,416,271 A * | 5/1995 | Birmingham | | F16L 5/08 |
| | | | | 174/657 |
| 7,411,128 B2 | 8/2008 | Drotleff et al. | | |
| 7,806,374 B1 * | 10/2010 | Ehmann | | H02G 3/22 |
| | | | | 174/40 R |
| 8,093,513 B2 * | 1/2012 | Elm | | F16L 5/08 |
| | | | | 174/151 |
| 8,674,240 B2 * | 3/2014 | Karlsson | | F16L 5/08 |
| | | | | 174/652 |
| 8,963,010 B2 * | 2/2015 | Sprenger | | H02G 3/083 |
| | | | | 174/151 |
| 9,190,820 B2 * | 11/2015 | Nurmi | | H02B 1/305 |
| 2004/0011549 A1 * | 1/2004 | Kiely | | H02G 3/0691 |
| | | | | 174/668 |
| 2005/0067832 A1 * | 3/2005 | Marelli | | F16L 19/0656 |
| | | | | 285/139.1 |
| 2005/0115733 A1 * | 6/2005 | Kreutz | | F16L 5/14 |
| | | | | 174/652 |
| 2008/0073120 A1 * | 3/2008 | Drotleff | | H02G 3/22 |
| | | | | 174/77 R |
| 2010/0319985 A1 * | 12/2010 | Trimpe | | H02G 3/083 |
| | | | | 174/520 |
| 2011/0147081 A1 * | 6/2011 | Best | | H02G 3/0633 |
| | | | | 174/84 R |
| 2015/0083486 A1 * | 3/2015 | Hill | | H02G 3/0675 |
| | | | | 174/653 |
| 2018/0301883 A1 * | 10/2018 | Nowastowski-Stock | | H02G 1/06 |

FOREIGN PATENT DOCUMENTS

| | | |
|---|---|---|
| DE | 102007003752 A1 | 7/2007 |
| DE | 202016102878 U1 | 6/2017 |
| EP | 1091465 A2 | 4/2001 |
| JP | 2013230012 A | 11/2013 |
| WO | WO-2013020827 A2 | 2/2013 |
| WO | WO-2016177364 A1 | 11/2016 |
| WO | WO-2017125625 A1 * | 7/2017 ........... H02H 3/0675 |

* cited by examiner

ASSEMBLY FOR A CABLE FEEDTHROUGH

CROSS-REFERENCE TO RELATED APPLICATION

This application claims the benefit and priority of DE 202017106818.8 filed Nov. 9, 2017. The entire disclosure of the above application is incorporated by reference.

FIELD

The present disclosure relates to an assembly for a cable feedthrough.

BACKGROUND

Cable feedthroughs or entries are used to introduce one or more cables into a housing, for example a switching cabinet housing, through a cutout or opening in a housing wall.

A cable grommet for a cable feedthrough is disclosed in document DE 20 2016 102 878 U1, for example.

Document WO 2016/177364 A1 describes an assembly with a wall lead-through for multiple cables. In this case, multiple sealing elements are arranged in a housing of a wall lead-through, and each receives a cable in such manner as to provide a circumferential seal.

A cable entry with strain relief is disclosed in document DE 10 2007 003 752 A1. The peripherally closed cable entry includes a sealing section and a strain relief arranged thereon. The sealing section is constructed with a sealing diaphragm which closes the opening in the cable entry and is pierced to pass the cable through, which is then surrounding in sealing manner by the sealing diaphragm. The sealing section is made from a soft elastic material, whereas the strain relief consists of a hard elastic material. When the cable entry is arranged in an opening in a housing wall, the strain relief made of hard elastic material is pushed or screwed into the opening. The sealing section is then located outside the housing opening in such a way that flanges lie next to the housing opening on the inside and the outside of the housing to provide a seal.

SUMMARY

It is an object of the invention to provide an assembly for a cable feedthrough or passthrough with which the cable can be received simply and efficiently in the cable feedthrough and fitted in a cutout or opening in a housing wall, also particularly in conjunction with pre-tailored cables.

To solve this problem, an assembly for a cable passthrough in a wall according to independent claim 1 is provided. Further embodiments are the object of dependent claims.

According to one aspect, an assembly is provided for a cable passthrough in a wall with a cable feedthrough. The cable feedthrough has a sealing section, made from a soft plastic component the sealing section having an opening extending in the lengthwise direction for accommodating in sealing manner a cable which is to be passed through a housing wall, and a strain relief, made from a hard plastic component which is formed integrally onto the sealing section and has a passthrough in the lengthwise direction for the cable that is to be passed through, which passthrough is aligned with the opening. The cable feedthrough also has a slotting arrangement which extends in the lengthwise direction of the cable feedthrough over the sealing section and the strain relief, and through which the cable to be passed through can be introduced into the opening and the passthrough from the outside from a direction transverse to the lengthwise direction.

Thus, it is possible to insert the cable that is to be passed through the housing in the cable feedthrough not only by inserting the cable frontally, but also from the side, through the slotting arrangement in the cable feedthrough. This in particular makes it possible to use the cable feedthrough for pre-tailored cables as well, in which an electrical component or element has already been pre-mounted on an end of the cable. The cable feedthrough may easily be opened in the area of the slotting arrangement so that the cable can be placed or inserted therein, particularly from the side.

The cable feedthrough may be constructed in several parts, such that component halves of the cable feedthrough each includes one half of the sealing section and one half of the strain relief connected integrally thereto. The cable feedthrough may include two or more component halves, each of which then includes one half of the sealing section and one half of the strain relief connected integrally thereto. The component halves are separated by means of further slotting arrangements. When assembled or joined, the component halves form the complete cable feedthrough. Centring means may be provided on component halves which are thus connected to each other, fixing the positions of the component halves relative to each other. In one embodiment, the centring means may have a projection on one component half and a matching recess for the projection on an opposite component half. The centring means, for example the projection, may consist of the hard plastic component. In one embodiment, the cable feedthrough consists of exactly two component halves, which are constructed as two half shells, for example.

The component halves may be connected to each other detachably by means of a plug connection.

Paired plug connectors may be arranged on the sealing section and/or on the strain relief to form the plug connection. The paired plug connectors may be mutually assigned snap connectors, for example.

The paired plug connectors may be made from the hard plastic component.

The component halves may be connected to each other pivotably via a hinge joint. In conjunction with the hinge joint, it may be provided that the cable feedthrough has a safety device, with which the hinge joint is secured against inadvertent opening, for example with a snap lock, in which paired safety elements snap into engagement when the component halves are connected to each other. The snap lock is detachable to allow the hinge joint to pivot upwards. The hinge joint may consist of living hinges, which extend in the lengthwise direction on the cable feedthrough beside one of the slotting arrangements. The hinge joint may be made at least partly from the soft plastic component. Alternatively or additionally, the hinge joint may be made from the hard plastic component.

The cable feedthrough may be designed as a two-component injection-moulded part. In this or in other embodiments, the soft plastic component and the hard plastic component may be compatible plastic materials.

An anchoring section of the strain relief may be arranged on the sealing section and, there, may be at least party enclosed by the soft plastic component. The anchoring section, which may be constructed in one or several parts, may be surrounded, substantially in its entirety, by the soft plastic component.

The anchoring section may encircle the opening radially in the sealing section. The anchoring section may surround the circumference of the opening in a closed manner or with interruptions.

At least a part of the paired plug connectors may be formed onto the anchoring section in the sealing section. The one or more paired plug connectors may be formed integrally onto the anchoring section.

The strain relief may have strain relief detent elements arranged around the passthrough. The strain relief detent elements may be biased elastically against widening of the passthrough in the region of the strain relief detent elements, for example with one or more spring arms with which the strain relief detent elements are formed. For example 3, 4 or 5 strain relief detent elements, each including one or more springs arms, may be arranged in particular at equal distances around the circumference of the passthrough.

The strain relief detent elements may be supported on a stiffening element of the strain relief on a rear side facing away from the passthrough. The stiffening element may be formed with a stiffening cage, which comprises reinforcing braces with openings or cutouts arranged between them, which may optionally make it possible to see the cable from outside when it is arranged inside the cable feedthrough.

The strain relief detent elements may be biased against widening of the passthrough in the region of the strain relief detent elements by means of an end stop on an assigned, yielding support element made from the soft plastic component. The yielding support element may be constructed to surround the circumference of the passthrough in a closed manner or with interruptions. The yielding support element may itself be supported on the stiffening element, for example it may be arranged thereon.

The sealing section may be arranged in an opening in a housing wall. Whereas the sealing section is arranged in the opening of the housing wall itself, the strain relief may be arranged partly or completely outside the opening of the housing wall on either side of the housing wall. In this way, the strain relief may be arranged without contact with the housing wall, in particular unsupported by the housing wall, in the region of the opening in the housing wall, for example. Surface sections of the sealing sections extending around the outside may be in direct contact with sections of the wall in the region of the opening in the housing wall and so create a seal with the housing wall. Alternatively, it may be provided that the sealing section is arranged in a frame of a wall passthrough, wherein a grid component may be arranged in the frame, thus providing a plurality of mounting pockets for sealing sections of the cable feedthroughs inside the frame. A wall passthrough as such is known from WO 2016/177364 A1 for example.

A pre-tailored cable may be arranged in the assembly, and extend through the opening in the sealing section and the passthrough in the strain relief.

DRAWINGS

In the following, further exemplary embodiments will be explained with reference to the figures of a drawing. In the drawing.

DETAILED DESCRIPTION

Figure 1:
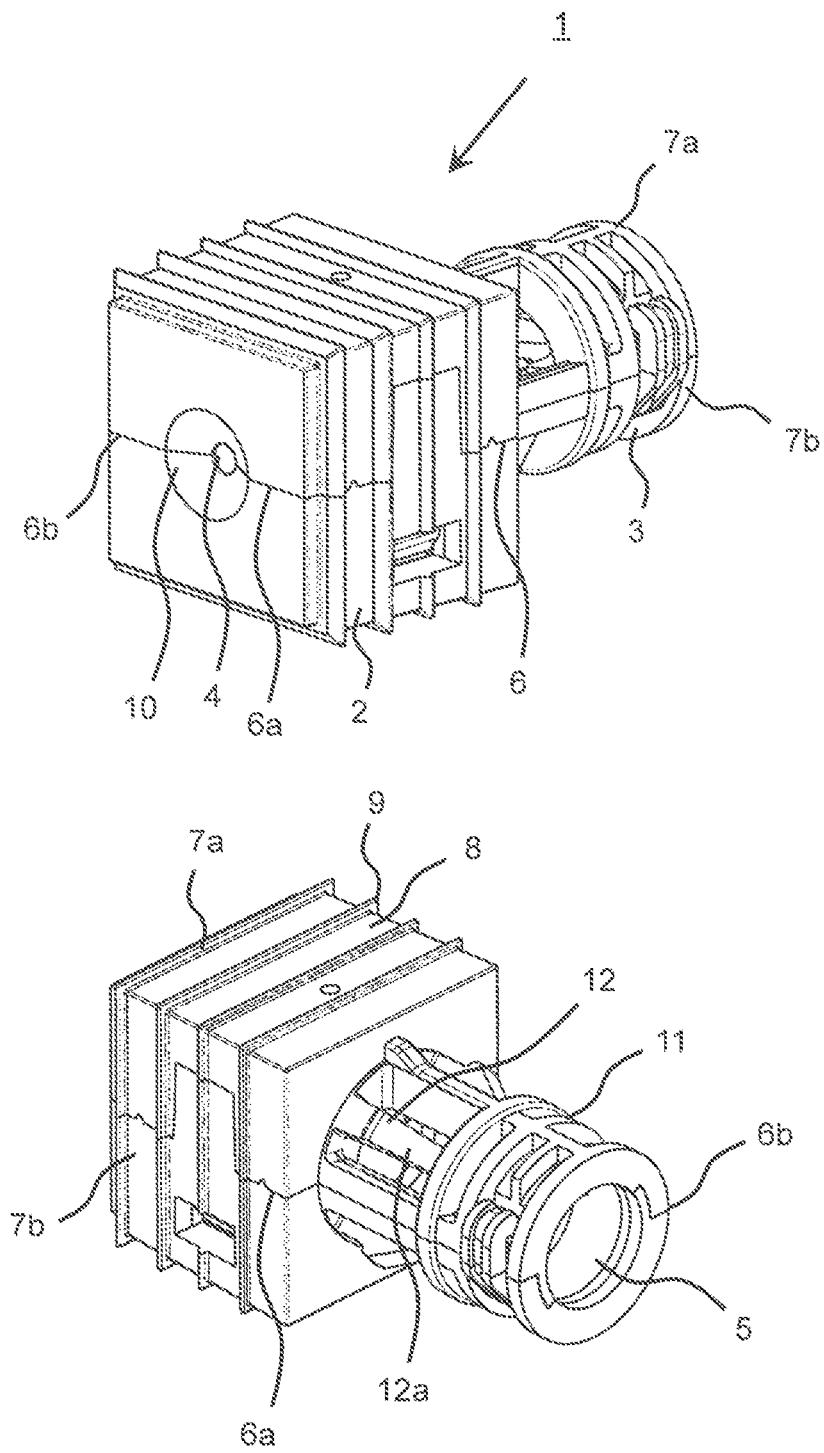
FIG. 1 shows representations of a cable feedthrough in perspective view.

FIG. 1 shows schematic representations of a cable feedthrough 1, which has a sealing section 2 made from a soft plastic component and a strain relief 3 moulded integrally therewith. The sealing element 2 has an opening 4 for the sealing accommodation of a cable, particularly a pre-tailored cable on which an electrical or electronic component or part is already mounted on at least one end of the cable. The strain relief 3 has a passthrough 5 which extends along the lengthwise direction thereof to accommodate the cable and which is aligned with the opening 4. A slotting arrangement 6 extends over the sealing section 2 and the strain relief 3, formed with partial slotting arrangements 6a, 6b in the variant shown, thereby creating two component halves 7a, 7b which are connected detachably to each other.

The sealing element 2 has sealing lips 9 on an outer surface 8 thereof, which in the variant shown are designed to pass around the periphery without interruption. Inner sealing lips 10 surround the opening 4.

A reinforcing cage 11 is formed in the region of the strain relief 3 and encircles the passthrough 5 radially.

Figure 3:
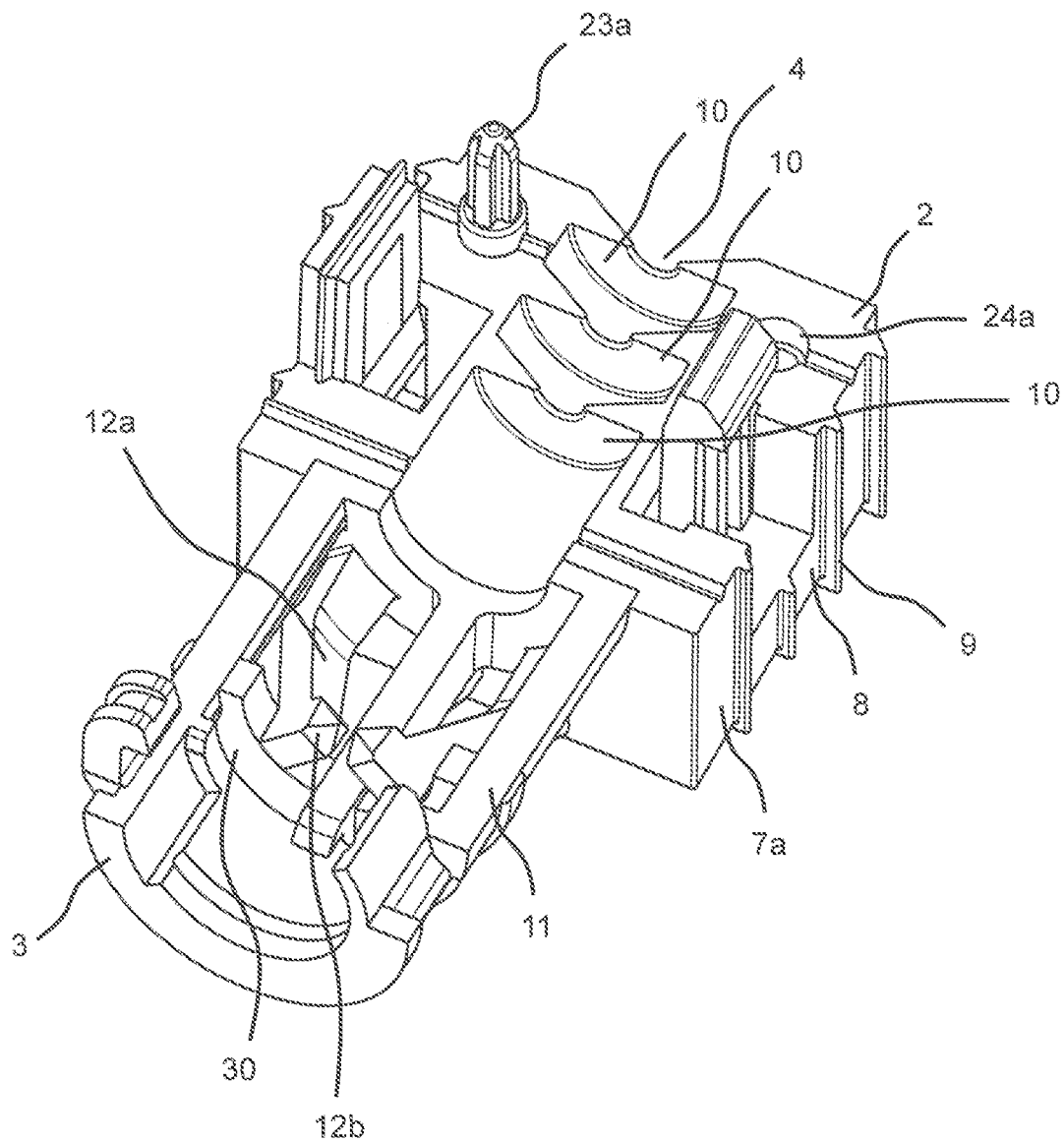
FIG. 3 shows a representation of a component half for the further cable feedthrough of FIG. 2 in perspective view.

The strain relief 3 includes strain relief detent elements 12, which are arranged separately around the passthrough 5 and in the variant shown are each furnished with a spring arm 12a and a detent element 12b (see FIG. 3).

Figure 2:
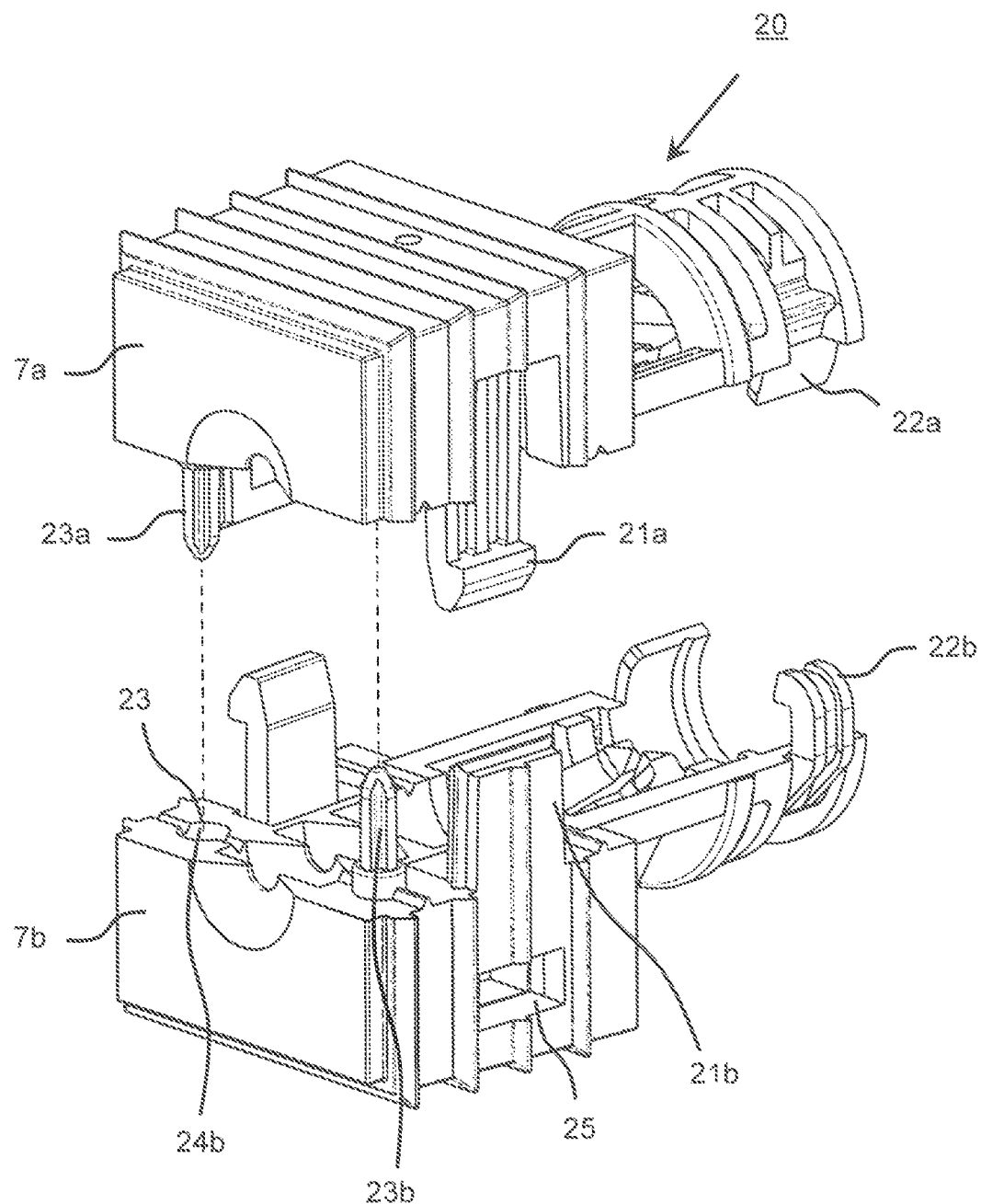
FIG. 2 shows a further cable feedthrough with two component halves which are separate from each other in perspective view.

FIG. 2 shows a further cable feedthrough 20. For identical features, the same reference numbers as in FIG. 1 are used in FIG. 2. In the further cable feedthrough 20, the component halves 7a, 7b are separated from each other. FIG. 3 shows a perspective representation of the component half 7a obliquely from above. The component halves 7a, 7b are connected detachably to each other by means of a plug connection, wherein paired plug connectors 22a, 22b are arranged in the region of the sealing element 2 on the component halves 7a, 7b and further paired plug connectors 22a, 22b are arranged in the region of the strain relief 3. The plug connectors 21a, 21b and the further plug connectors 22a, 22b are each provided as snap connectors in the design shown. Plug connectors 21a, 21b and further plug connectors 22a, 22b are provided on opposite sides of each of the component halves 7a, 7b.

Centring means 23 with centring pins 23a, 23b is provided to secure and fix the relative position of the component halves 7a, 7b. When the component halves 7a, 7b are joined, the centring pin 23a is located in a matching recess 24.

The plug connectors 21a, 21b and the centring pins 23a, 23b may be made from the hard plastic component. Alternatively, it may be provided to manufacture at least some of the plug connectors 21a, 21b from the soft plastic component, for example the plug connectors 21b with a corresponding socket 25.

FIG. 3 shows a perspective representation of the component half 7a from above. This reveals that the strain relief detent elements 12 are supported on the back, in the region of the detent element 12b, on a support element 30, which may be made from the soft plastic component and is designed to be yielding, wherein the support element 30 itself is supported on the reinforcing cage 11. According to FIG. 3, several inner sealing lips 10 are arranged one behind the other axially in the region of the opening 4.

Figure 4:
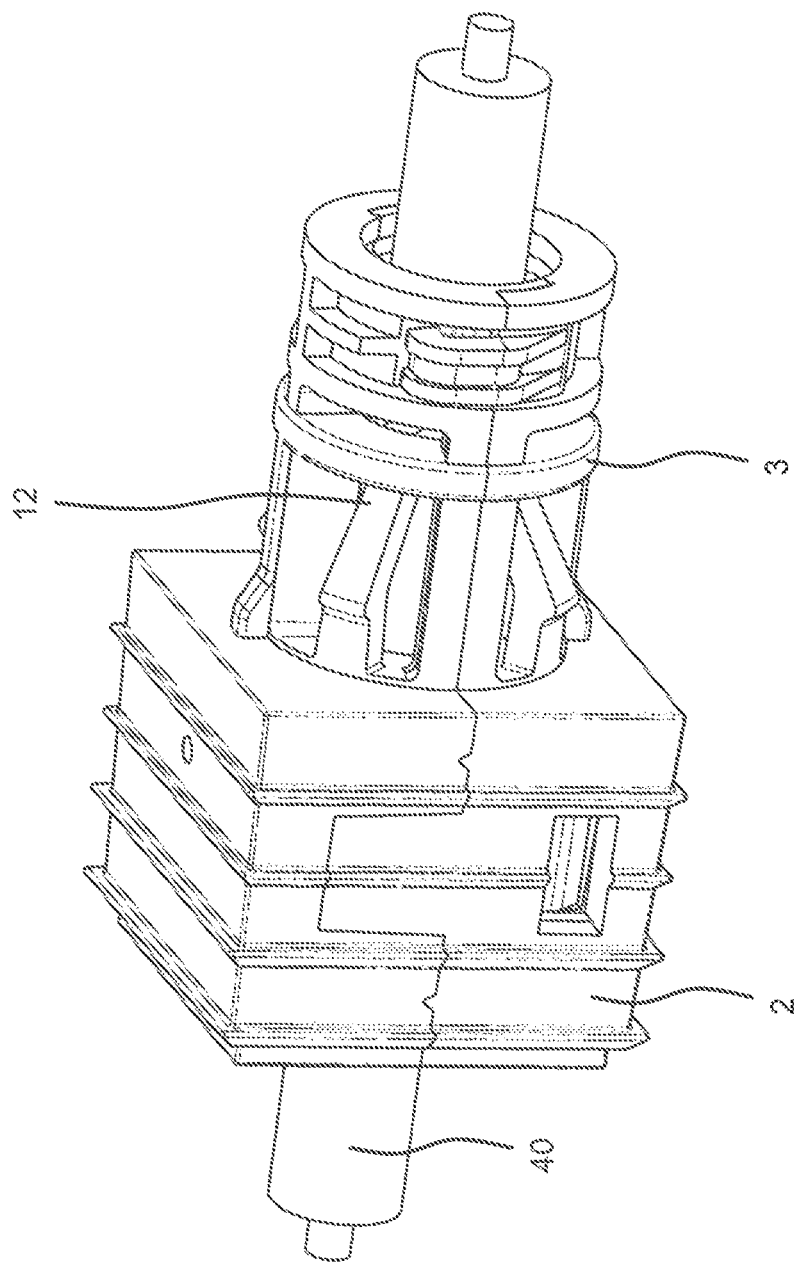
FIG. 4 shows a cable feedthrough with a cable introduced in perspective view.

FIG. 4 shows a perspective representation of an assembly with the cable feedthrough 1 and a cable 40 accommodated therein.

Figure 5:
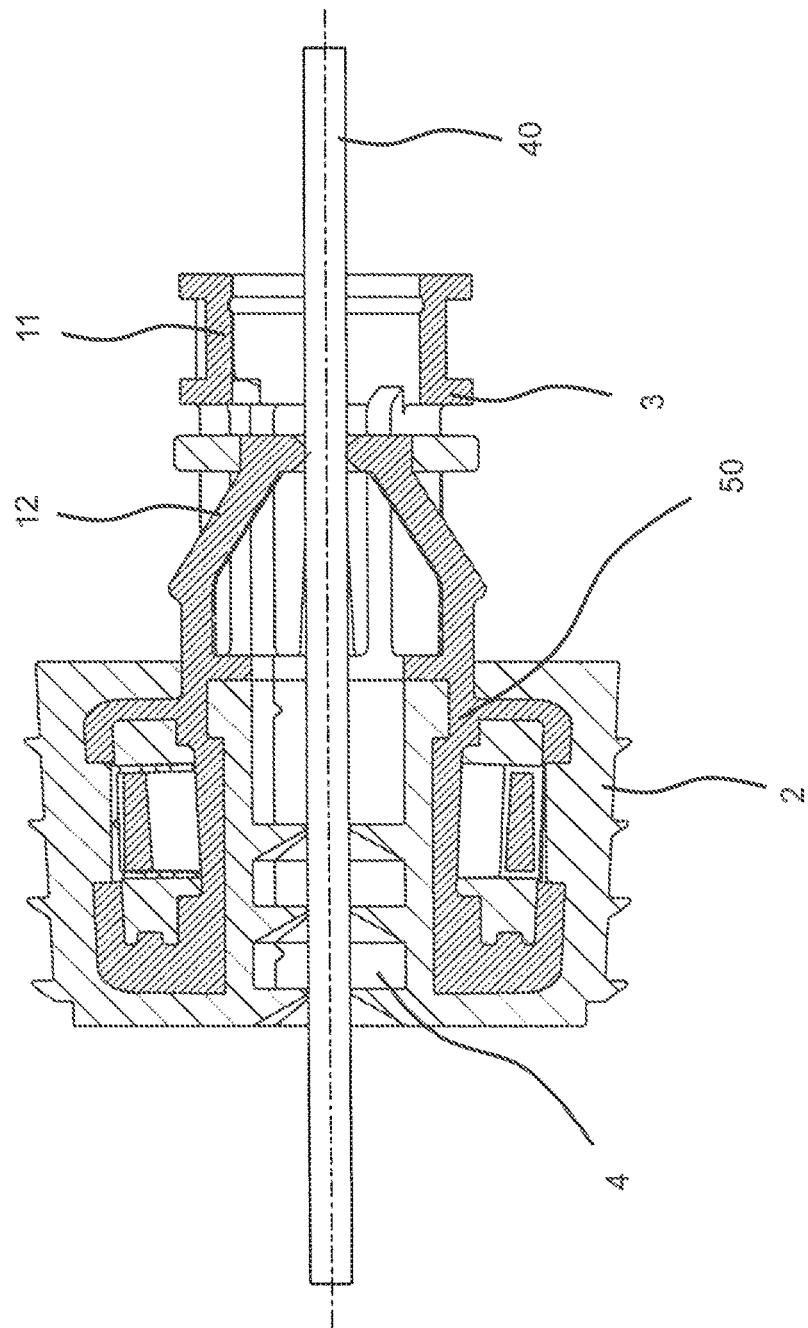
FIG. 5 is a representation of a cross section through the cable feedthrough of FIG. 4 with a cable introduced.

FIG. 5 shows a cross section through the assembly of FIG. 4. This reveals that the strain relief 3 has an anchoring section 50 in the region of the sealing element 2, onto which the strain relief detent elements 12 are formed integrally, wherein the anchoring section 50 is surrounded, substantially in its entirety, by the soft plastic component. If the cable feedthrough 1, 20 is produced in a two-component injection-moulding process, at least part of the anchoring section 50 is encased in the injection moulded soft plastic component.

Figure 6:
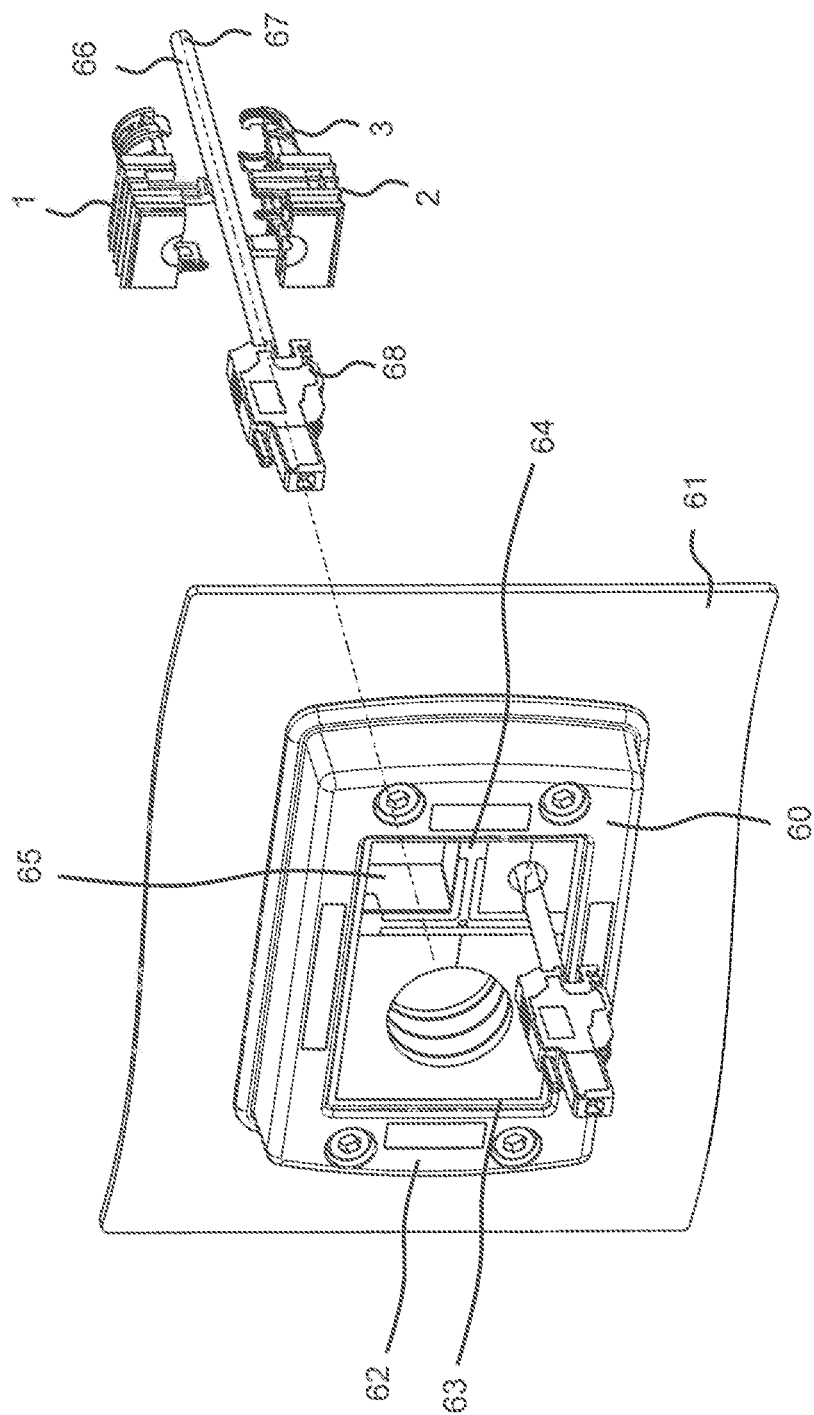
FIG. 6 is a representation of an assembly with a wall passthrough in which a cable feedthrough is integrated in perspective view Corresponding reference numerals indicate corresponding parts throughout the several views of the drawings.

FIG. 6 shows a schematic perspective representation of an assembly with a wall passthrough 60 which is arranged over an opening in a housing wall 61. The wall passthrough 60 has a frame 62 in which an installation space 63 is formed, which holds a grid component 64 with which a plurality of seatings 65 are provided for one or more cable feedthrough sealing sections 2. The sealing section 2 of the cable feedthrough 1 is then accommodated in a sealing manner in the installation space 63, so that the pre-tailored cable 66 with cable 67 and component 68 mounted thereon can be passed through the housing wall 61 in a sealed manner.

Frame 62 is mounted on one side of the housing wall 61 and enables the cable feedthroughs to be assembled from the opposite side.

The features disclosed in the preceding description, the claims and the drawing may be relevant either separately or in any combination for the realisation of the various embodiments.

The invention claimed is:

1. Assembly for a cable passthrough in a wall, with a cable feedthrough including:
   a sealing section made from a soft plastic component, the sealing section having an opening extending in the lengthwise direction for sealing accommodation of a cable that is to be passed through a housing wall;
   a strain relief made from a hard plastic component, which is formed integrally onto the sealing section and has a passthrough in the lengthwise direction for the cable that is to be passed through, which passthrough is aligned with the opening, where the strain relief has strain relief detent elements arranged around the passthrough and protruding inward towards the passthrough to engage the cable, the strain relief detent elements being formed with one or more spring arms and biased elastically against widening of the passthrough in a region of the strain relief detent elements by means of the one or more spring arms; and
   a slotting arrangement which extends over the sealing section and the strain relief in the lengthwise direction of the cable feedthrough and through which the cable to be passed through can be introduced into the opening and the passthrough from the outside from a direction transverse to the lengthwise direction.

2. Assembly according to claim 1, includes the cable feedthrough is constructed in several parts, such that component halves of the cable feedthrough each include one half of the sealing section and one half of the strain relief connected integrally thereto.

3. Assembly according to claim 2 includes the component halves are connected detachably to each other by means of a plug connection.

4. Assembly according to claim 3, includes paired plug connectors are arranged on the sealing section and/or on the strain relief to form the plug connection.

5. Assembly according to claim 4, includes the paired plug connectors are made from the hard plastic component.

6. Assembly according to claim 2, includes the component halves are connected to each other pivotably via a hinge joint.

7. Assembly according to claim 1, includes the cable feedthrough is designed as a two-component injection-moulded part.

8. Assembly according to claim 1, includes an anchoring section of the strain relief is arranged on the sealing section and, there, is at least partly enclosed by the soft plastic component.

9. Assembly according to claim 8, includes the anchoring section encircles the opening radially in the sealing section.

10. Assembly according to claim 8, includes at least a part of the paired plug connectors is formed onto the anchoring section in the sealing section.

11. Assembly according to claim 1, includes the strain relief detent elements are supported on a stiffening element of the strain relief on a rear side facing away from the passthrough.

12. Assembly according to claim 1, includes the strain relief detent elements are biased against widening of the passthrough in the region of the strain relief detent elements by means of an end stop on an assigned, yielding support element made from the soft plastic component.

13. Assembly according to claim 1, includes the sealing section is arranged in an opening in a housing wall.

14. Assembly according to claim 1, includes a pre-tailored cable is arranged in the cable feedthrough and extends through the opening in the sealing section and the passthrough in the strain relief.

* * * * *